Figure 1:
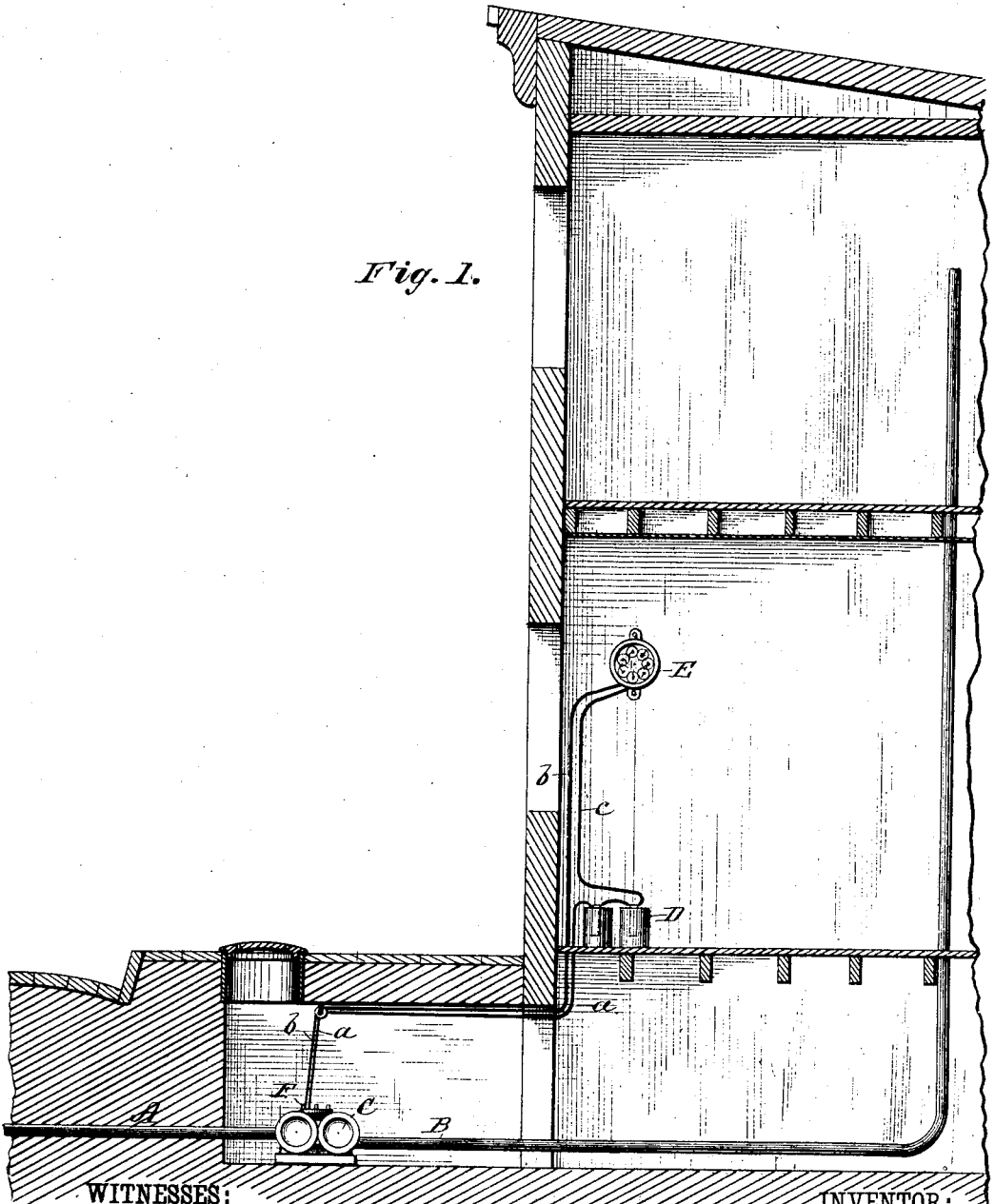

(No Model.) 2 Sheets—Sheet 1.

G. CRESSEY.
ELECTRIC WATER METER REGISTER.

No. 245,139. Patented Aug. 2, 1881.

WITNESSES:
Fred G. Dieterich
Edw. W. Byrn

INVENTOR:
Geo. Cressey
BY
ATTORNEYS.

(No Model.) 2 Sheets—Sheet 2.
G. CRESSEY.
ELECTRIC WATER METER REGISTER.
No. 245,139. Patented Aug. 2, 1881.
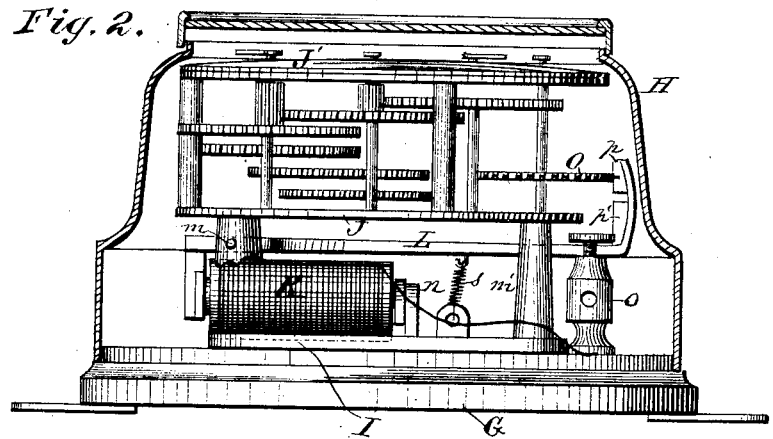
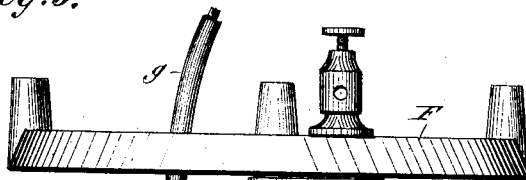
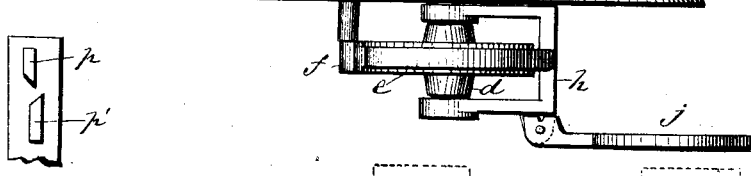
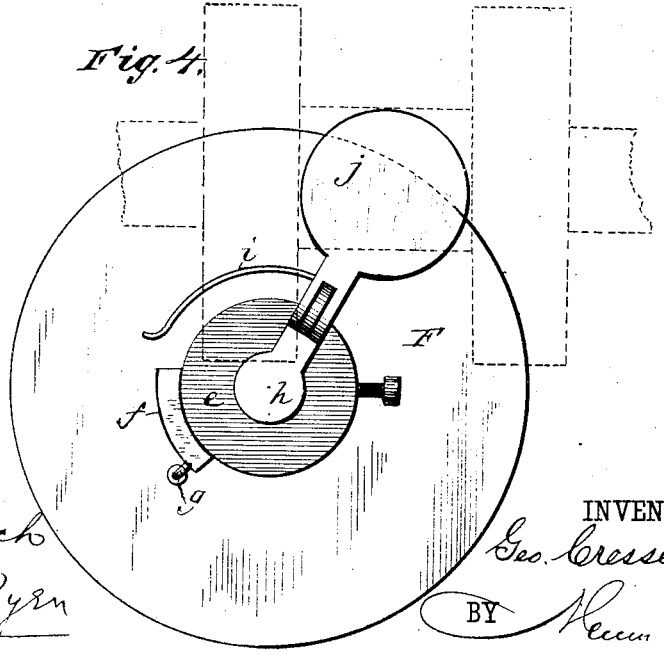
WITNESSES:
Fred G. Dieterich
Edw. W. Byrn
INVENTOR:
Geo. Cressey
BY
ATTORNEYS.

UNITED STATES PATENT OFFICE.

GEORGE CRESSEY, OF LOUISVILLE, KENTUCKY.

ELECTRIC WATER-METER REGISTER.

SPECIFICATION forming part of Letters Patent No. 245,139, dated August 2, 1881.

Application filed April 25, 1881. (No model.)

*To all whom it may concern:*

Be it known that I, GEORGE CRESSEY, of Louisville, in the county of Jefferson and State of Kentucky, have invented a new and Improved Electric Water-Meter Register; and I do hereby declare that the following is a full, clear, and exact description of the same, reference being had to the accompanying drawings, forming part of this specification, in which—

Figure 1 is a general view, showing the relative arrangement of the water-meter, circuit-wires, battery, and register when in use. Fig. 2 is a side view of the register, with its case in section. Fig. 3 is an edge view of the cap to the meter, provided with insulating and contact pieces for alternately making and breaking the electric circuit. Fig. 4 is an inside face view of the same, showing in dotted lines the pistons of the water-meter, which operate upon the tappet to move these parts. Fig. 5 is a detail, showing the arrangement of the pallets of the register for imparting a step-by-step movement to the gear-wheels.

One of the difficulties met with in the correct measurement of water used by consumers is the lack of a practical means for registering the amount of water that flows through the meter. Heretofore registers for water-meters have been submerged with or placed near the meter, in which relation they are greatly exposed to the action of the water and accumulations of dirt and mud, which render them inaccurate and unreliable. Furthermore, in transmitting the motion of the working parts of the meter to the registering device a pawl and ratchet, or their mechanical equivalent, have heretofore been used, which connect by a spindle or stem passing through the meter-case with the registering-wheel. This is objectionable for the reason that the action of the water speedily corrodes the metal parts, and, together with the gradual accumulation of deposit, renders the said pawls and ratchet inoperative; and, furthermore, the packing around the stem is a source of great annoyance by reason of leakage in some cases, while in others it becomes so hard and compressed that it holds the stem so tightly as to prevent its proper movement through the same and stops the registration.

The object of my invention is to avoid these difficulties and provide a practical and reliable means for registering the amount of water passed; and to this end my invention consists, principally, in combining an electro-magnetic register, a battery, and a circuit-wire with a water-meter, which circuit-wire enters the meter, and through proper insulations and contact-faces makes and breaks the current at every impulse of the piston or other working part of the meter without the necessity for a stem or any other movable part operating through the meter-case.

My invention also consists in the peculiar construction of the electro-magnetic counter, and in the particular means for connecting the working parts of the meter with the wires for making and breaking the circuit, as hereinafter more fully described.

In the drawings, Fig. 1, A represents the inlet-pipe, running from the water-main to a building in which water is being used; and B is the distributing-pipe, which carries the water up to the different parts of the building. At some point between these pipes A and B, and preferably in the cellar, basement, or vault, is arranged the meter C, which, as shown in the drawings, is what is known as the "Worthington meter," having two movable pistons or plungers working in parallel cylinders in connection with suitable valves. From this water-meter there run two properly-insulated circuit-wires, *a b*, one of which, *a*, runs to a battery, D, and the other of which, *b*, runs to an electro-magnet in the register E, while a wire, *c*, runs from said electro-magnet to the opposite pole of the battery.

The register E, it will be seen, is located in an office or lower story of the building, and is entirely removed from all influences which would affect its operative character, and as the current from the battery is alternately made and broken at the meter, said electric current, through the electro-magnet of the register, produces in the register a movement contemporaneous with and indicative of the successive discharges from the meter, securing a practically automatic action without the friction and other objections which a stem or other movable part working through the case involves.

For making and breaking the circuit in the meter the movable cap or plate F of the meter (see Figs. 3 and 4) is provided with a stem, $d$, projecting inwardly, and carrying a disk, $e$, of hard rubber or other non-conducting material. On the periphery of this insulating-disk is placed a metal contact-plate, $f$, which is connected with a wire, $g$, that passes through the plate F above and connects with one of the circuit-wires, $a$. This wire $g$ is carefully insulated from the plate where it passes through the same, so that the contact-plate $f$ forms its proper terminal.

Upon the stem $d$, projecting inwardly from the meter-cap, is hung a loosely-vibrating bracket, $h$, carrying a curved contact-spring, $i$, which, as the bracket is oscillated about the stem as a center, alternately passes on and off the contact-plate $f$. Now this bracket and spring are in electrical connection with the meter-case, upon which is mounted a binding-post, connecting with the other wire, $b$, and whenever the contact-spring $i$ passes upon the contact-plate $f$ the circuit is completed through this connection, and when it passes off of the same the current is practically broken. For giving to the bracket the proper movement for this purpose it has attached to it an arm or tappet, $j$, having a disk at its end, which rests between the pistons of the meter, as shown by dotted lines in Fig. 4, so that when the piston moves in one direction it closes the circuit, and when in the opposite direction it practically opens the same, giving an impulse or movement to the armature of the electro-magnet in the register for every successive discharge from the meter.

Referring to the breaking of the current between the contact-spring $i$ and the plate $f$, I say the current is practically broken. What I mean by this is that the greater part of the current is cut off; but these two parts being still connected by the water in which they are submerged, a portion of the current will get through. I have found by practice, however, that the weight of the armature-levers or the tension of the spring is easily adjusted, so that the armature is not affected by this fractional part of the current, but is positively and surely affected by the full strength of the current as closed through the metal contacts. The application of this principle in this connection I believe to be a feature of great merit, for it enables me to put the contact-points within the meter and submerged in the water, which dispenses with stems or other devices working through the case of the meter.

The register (see Fig. 2) has a base or back piece, G, and an outer case, H. Upon this base or back piece is fastened a metal frame, I, having posts $m\ m'$, upon the top of which are sustained two metal disks, $J\ J'$, between which is contained a train of wheels whose arbors are extended through the top disk and provided with pointers, and which top disk is made with dial-faces.

Upon a lug, $n$, of the frame I is fastened the electro-magnet K, which connects with the circuit-wires to the meter through the binding-posts $o$.

L is the armature-lever, which is made in right-angular form, pivoted at its bend to the posts $m$, and one of whose arms descends to the cores of the magnet and carries the armature, and the middle part of which extends horizontally above the magnet and below the disks $J\ J'$ to an adjusting-screw, and is there turned up at right angles and carries two beveled pallets, $p\ p'$, which, as the armature-lever is moved up and down, impart a step-by-step movement to the wheel O, which is the first of the series, and has narrow pin-shaped teeth, which are alternately engaged by the two pallets $p\ p'$. This armature-lever is moved in one direction by the influence of the magnet, and in the other by its weight or the tension of a spring, $s$.

In carrying out my invention I would state that I do not confine myself to any particular form of register, nor to any particular form of meter, nor to making electrical contact with any particular part of the meter, as the connections may be made by the movement of the piston, valve, or other working part.

In defining my invention with greater clearness with respect to the prior state of the art, I would state that I am aware that a water-meter has been constructed in which a permanent magnet was attached to the wheel or other rotating part of the meter, and which magnet was designed to influence the rotation of an armature outside of the meter-case, and thus rotate the registering devices. With this construction, however, there was no definite electric circuit which was alternately made and broken, and hence such construction was objectionable and impracticable, for the following reasons: The registering devices were necessarily associated directly with the meter, and they were therefore exposed to the concomitant wet, slime, and other fouling influences of the meter; and, secondly, as the meter-case intervened between the armature and the permanent magnet within, the armature was, of a necessity, so far removed from the influence of the magnet as to weaken, if not destroy, its useful effect; and, furthermore, there being no positive connection between the armature and magnet, an easy opportunity was afforded for the surreptitious stoppage of the register, while the meter would continue to pass water. On the other hand, I am aware that electrical registers connecting with a definite circuit and circuit-breaking devices have been heretofore applied to various uses, such as game-counters, turn-stiles, ships' logs, &c., and I do not claim this broadly. I do not know, however, that a water-meter has ever been provided with electrical contacts located within and operated by some movable part of the meter, and which contacts connect through circuit-wires with an electro-magnetic register removed from the vicinity of the meter. The advantages of this organization are to be found in the facts, first, that the registering devices are not fouled by direct association with the meter; secondly, all stems and parts working through the meter-case are avoided; and, thirdly, the contacts being housed by the meter-case they cannot be tampered with to defeat the ends of the meter.

In still further defining my invention I would state that I am aware that an electrical circuit has been used in connection with a low-water indicator for a steam-boiler, the poles of which circuit were connected or disconnected by a float, whose changes in position brought said poles in contact, or vice versa. My invention differs from this in that it is applied to the definite and constant measurement, in aliquot parts, of the volume of passing or flowing water, and the making and breaking of contact are effected contemporaneously with and by the same agency which effects said definite measurement.

Having thus described my invention, what I claim as new is—

1. A water-meter having within its case electrical contacts arranged within the water-space, so as to be submerged in the water, and operated by a movable part of the meter, combined with an electrical circuit and an electro-magnetic register removed from the meter, as and for the purpose described.

2. The register herein described, consisting of a frame, I, having posts $m\ m'$ and lug $n$, the electro-magnet fastened to said lug, the disks J J', located upon the posts $m\ m'$ and carrying the spur-wheels, pointers, and dials, and the armature-lever arranged between the disks J J' and the magnets, and having an arm extending down in front of the magnets at one end, and another arm at the opposite end extended in the opposite direction and provided with pallets $p\ p'$, operating upon the first wheel of the train, as described.

3. The plate F of the water-meter, having an inwardly-projecting stem, $d$, bearing a non-conducting disk, $e$, with contact-plate $f$, the insulated connecting-wire $g$, and a swinging bracket or support swiveling upon the stem $d$ and operated by the piston of the meter, substantially as described.

GEORGE CRESSEY.

Witnesses:
EDWD. W. BYRN,
SOLON C. KEMON.